United States Patent Office 2,730,489
Patented Jan. 10, 1956

2,730,489

USE OF ORGANIC NITRITES TO INHIBIT POLYMERIZATION OF HYDROCARBONS DURING DISTILLATION

Ernest E. Lewis, Chadds Ford, Pa., assignor to E. I. du Pont de Nemours and Company, Wilmington, Del., a corporation of Delaware No Drawing. Application September 21, 1951,
Serial No. 247,767

17 Claims. (Cl. 202—57)

This invention relates to a process for inhibiting polymerization during the distillation of compositions containing unsaturated hydrocarbons.

In the distillation of compositions containing unsaturated hydrocarbons, it is known that polymerization of these compounds is likely to occur, and the introduction of a wide variety of inhibitors has been proposed, in order to minimize this undesired polymerization. The two classes of inhibitors which have been employed most extensively are the aromatic amino compounds and the hydroxy benzene derivatives such as catechol, pyrogallol, etc.

When the hydrocarbon compositions subjected to distillation contain even small amounts of a diolefin, such as butadiene, isoprene, cyclopentadiene, or the like, there is frequently formed a particularly obnoxious kind of polymer which has been designated in the industry as "popcorn" polymer. This "popcorn" polymer is obnoxious because it is essentially non-fusible and insoluble in ordinary solvents. Hence, once the "popcorn" polymer has formed, it can be removed from the distillation equipment only with the greatest difficulty. This removal, in practice, ordinarily involves a complete shutdown of the equipment so that the polymer can be removed manually. Furthermore, once a seed of this polymer has been formed, it propagates rapidly, despite the presence of ordinary polymerization inhibitors. Apparently, the initial formation of the "popcorn" polymer is dependent upon the presence of a diolefin.

This "popcorn" polymer can interfere very seriously with commercial distillation operations. It adheres tenaciously to heat transfer surfaces, with the result that the rate of heat transfer into the equipment drops off very rapidly. It also forms on the trays or packing in the columns and prevents the normal flow of the liquids and gases therein. If allowed to propagate for a long enough period of time, the "popcorn" polymer can actually result in distortion or rupture of the equipment.

It is an object of this invention to provide a process for distilling compositions comprising unsaturated hydrocarbons. It is another object of this invention to provide a polymerization inhibitor capable of preventing undesirable polymerizations when carrying out the distillation of unsaturated hydrocarbons. A further object of the invention is to provide a process for concentrating or purifying a hydrocarbon containing no more than 4 carbon atoms from a hydrocarbon composition comprising a diolefin containing from 3 to 6 carbon atoms. A still further object of the invention is to provide a process for purifying ethylene wherein a low-boiling hydrocarbon mixture containing said ethylene and also containing a small amount of butadiene is absorbed in a higher-boiling hydrocarbon mixture, and thereafter subjected to distillation in the presence of an effective polymerization inhibitor. Other objects of the invention will appear hereinafter.

In accordance with this invention there is provided a process for minimizing polymer formation when distilling a composition comprising a major portion of hydrocarbons containing no more than six carbon atoms, said composition containing at least 0.01 per cent by weight of a diolefin having from 3 to 6 carbon atoms, which process comprises carrying out the distillation of said composition in the presence of a polymerization inhibitor comprising from 0.001 per cent to 5 per cent, based on the weight of said composition, of a nitrite of the formula $R.NO_2$ in which R is a hydrocarbon radical having from 1 to 8 carbon atoms and having an alkyl carbon atom to which the nitrite group is attached.

In accordance with a preferred embodiment of the invention, the composition which is subjected to distillation consists primarily of a mixture of hydrocarbons rich in paraffins and olefins containing no more than 4 carbon atoms, together with a relatively small quantity of a low-molecular weight diolefin such as butadiene, isoprene, or cyclopentadiene. According to another preferred embodiment of the invention, the inhibitor which is employed comprises from 0.001 per cent to 0.10 per cent of isoamyl nitrite, based on the weight of the composition being distilled.

The process of the present invention is useful in connection with the distillation, redistillation, concentration and/or purification of hydrocarbon-containing compositions in which at least a portion of the hydrocarbons comprises a relatively low-molecular weight unsaturated hydrocarbon. The compositions suitable for use in this process are those in which a major portion of the composition, i. e., at least 50% by weight, is made up of hydrocarbons containing no more than 6 carbon atoms. These relatively low-molecular weight hydrocarbons may be paraffins, isoparaffins, olefins, diolefins, alicyclic compounds, or aromatic compounds. In the distillation of compositions of this nature, the major difficulty apparently stems from the presence of one or more diolefins. Hence, the polymerization inhibitors of the present invention find the greatest utility in connection with the distillation of compositions containing at least a small amount of a diolefin. If desired, the compositions which are subjected to distillation may consist almost entirely of diolefins, although the preferred process involves the distillation of compositions containing relatively large amounts of low-molecular weight paraffins and monoolefins together with only relatively small amounts of diolefins. The mixture which is subjected to distillation may also comprise non-hydrocarbon portions such as oxygenated compounds having boiling points close to the hydrocarbons, polymerization inhibitors other than the alkyl nitrites, etc. Preferably, however, the compositions which are subjected to distillation in accordance with the process of the present invention consist almost exclusively of hydrocarbons.

According to one feature of the invention, a mixture consisting primarily of $C_2$ and $C_3$ saturated and unsaturated hydrocarbons, together with relatively small amounts of $C_4$ and $C_5$ diolefins, is subjected to a distillation operation for the concentration or purification of one or more of its constituents, notably ethylene. Such a mixture may be derived for instance from the catalytic or non-catalytic cracking of ethane, propane, butane, or the like. The treatment of such a mixture may involve absorbing it in a relatively higher-boiling hydrocarbon absorption medium. The enriched absorption medium may then be treated for the stepwise removal of the various hydrocarbons. For example, it may be treated initially in a de-ethanizer, from which ethane, ethylene and hydrocarbons boiling lower than ethane are removed overhead. The partially stripped absorption medium may then be passed from the de-ethanizer to a de-propanizer from which propane and propylene are removed overhead. At least a portion of the stripped absorption medium that is removed from the de-propanizer may then be recycled to the absorber. A process of this general nature is particularly useful for the manufacture of highly purified ethylene, the ethylene being recovered by fractionation of the gases taken overhead from the de-ethanizer.

The polymerization inhibitors which have been found to be useful in the process of this invention are the nitrites containing from 1 to 8 carbon atoms in the hydrocarbon group. Examples of suitable polymerization inhibitors are: methyl nitrite, ethyl nitrite, propyl nitrite, isopropyl nitrite, butyl nitrite, isobutyl nitrite, tertiary butyl nitrite, amyl nitrite, isoamyl nitrite, the hexyl, heptyl and octyl nitrites, benzyl nitrite, phenyl ethyl nitrite, cyclohexyl ethyl nitrite, and the like. The preferred polymerization inhibitors are ethyl nitrite, isopropyl nitrite and isoamyl nitrite, the latter being particularly preferred. The nitrites intended to be included are those in which the nitrite group is attached to an alkyl carbon atom. If desired, the alkyl group itself may be substituted by an aromatic or alicyclic structure. Hence, the term nitrite as used herein comprehends, for instance, the aralkyl nitrites such as benzyl nitrite, as well as the alkyl nitrites.

In selecting the particular nitrite to be employed in a given distillation, it is generally desirable to select a nitrite having a high enough boiling point so that it will remain primarily in the liquid phase. The reason for this is that the greatest difficulty from "popcorn" polymer formation occurs in the pot or calandria of the distillation column or on the lower plates thereof. Some undesirable polymerization also occurs in the vapor phase, however, and it may therefore be advantageous to select an inhibitor which will be distributed partially in the liquid phase and partially in the vapor phase. In order to accomplish this objective, it may be advantageous to employ several nitrites simultaneously, one of which will be concentrated primarily in the liquid phase, and the other of which will be concentrated primarily in the vapor phase. In processes where only the low-boiling constituents are taken overhead and the diolefins remain in the liquid phase, the presence of a nitrite inhibitor in the vapor phase is, in general, not required. In order to maintain a sufficient quantity of inhibitor in the distillation unit, it is frequently advisable to select as the polymerization inhibitor a nitrite having a boiling point substantially above the boiling point of the substances being taken overhead so that there is no problem of losing the inhibitor as the result of azeotrope formation.

The amount of inhibitor required depends upon a number of circumstances. If the equipment being employed is clean to begin with, then only very small amounts of inhibitor are required. On the other hand, if a unit has been in operation for some time and an appreciable amount of "popcorn" polymer has already accumulated, then a relatively greater amount of inhibitor may be necessary in order to forestall further propagation of the polymer. Secondly, as noted above, the initial formation of "popcorn" polymer appears to be dependent upon the presence of a diolefin such as butadiene or cyclopentadiene in the mixture being distilled. Accordingly, if the mixture contains only traces of diolefins, relatively small amounts of inhibitor may be satisfactory, whereas larger amounts may be required when distilling mixtures containing large amounts of one or more diolefins. Thirdly, the amount of inhibitor required may depend upon whether or not other inhibitors are being employed simultaneously. And finally, the amount of inhibitor will depend upon the particular nitrite selected, the nature of the feed material, and the temperatures and pressures employed.

The nitrites of the present invention may be employed, if desired, with a wide variety of other inhibitors. These other inhibitors may function primarily as oxidation inhibitors, or as polymerization inhibitors, or both. Their boiling point may be such that they are present either in the liquid phase, or in the vapor phase, or both. Generally speaking, most of the inhibitors known to the prior art may be employed in conjunction with the nitrites. Specific examples of inhibitors which can be employed along with the nitrites are: N-n-butyl-p-aminophenol, N,N'-disalicylal ethylenediamine, N,N'-disalicylal 1,2-diaminopropane, 1,1-dimethyl-3-(n-phenyloximino)butyl nitroxide, 2,2-diphenyl-1-picrylhydrazyl, p-nitrosodiethylaniline, tetraphenylhydrazine, tetranitromethane, nitrobenzene, nitrotoluene, 2,4-diphenylazophenol, ammonia, hydrazine, m-phenylenediamine, phenyl hydrazine, hexamethylenediamine, sodium nitrite, nitrogen oxides, and the like. The use of a catechol-type inhibitor, such as tertiary butyl catechol, in conjunction with the nitrite, has been found to give better results than the use of the nitrite alone. Certain of the above inhibitors, notably phenyl hydrazine and ammonia, give good results even in the absence of any nitrite.

The inhibitor or the inhibitors may be added at any point in the distillation unit. They may be added at the top of the column, at any intermediate portion of the column, or at the bottom of the column, in the pot or calandria. They may be added along with the feed or along with the reflux. They may be added to any one of several interconnected distillation columns or to several such columns. They may be added as the pure compound, or in solution in a suitable solvent, either as a solid stream or in the form of a mist or dispersion. When the distillation is such that only the very low-boiling hydrocarbons such as ethane, ethylene, propane or propylene, are being taken overhead, and the diolefins remain in the liquid phase, satisfactory results may be obtained by merely introducing the inhibitor near the bottom of the column or to the pot or calandria. On the other hand, if one or more of the diolefins, such as butadiene, isoprene, cyclopentadiene, the piperylenes, or the hexadienes are to be taken overhead in any appreciable amount, it is highly advisable to introduce the inhibitor at the top of the column or with the reflux. Furthermore, if any "popcorn" polymer has had an opportunity to form near the top of the column, it is advantageous to introduce the inhibitor at the top of the column.

The distillation process of the present invention can be carried out either batchwise or continuously. Either the heads or the bottoms from a given column may be passed to a subsequent distillation unit, in which case the inhibitor may be carried along and the introduction of inhibtitor at one point in a system can serve to protect a whole series of columns or distillation units.

The temperatures and pressures employed are, of course, dependent upon the particular separation being effected. The nitrite inhibitors can be employed satisfactorily in distillation processes operated at either atmospheric, subatmospheric, or superatmospheric pressure.

The concentrations of the inhibitor referred to herein are based upon the weight of inhibitor present at a particular moment within a given distillation unit as compared to the total weight of liquid material present in the unit at that time. In order to provide satisfactory protection, there should be present at least 0.001 per cent of nitrite inhibitor. In some instances, amounts up to 5 per cent may be employed or may be required. Usually, however, very small amounts of nitrite inhibitors will provide satisfactory protection and it is not necessary to employ a concentration greater than about 0.10 per cent. In processes which are operated continuously, or where the nitrite inhibitor is added with the feed or the reflux, or where the effluent from one column is passed along to one or more subsequent columns, it will be necessary to calculate the holdup of a particular distillation unit and the rate of introduction and removal of the inhibitor in order to provide the proper concentration.

Prior to starting up a given distillation unit, it is sometimes helpful to circulate through the unit a solution containing a relatively large concentration of the nitrite inhibitor in a solvent devoid of polymerizable constituents. In this way, the formation or propagation of "popcorn"

polymer which might otherwise occur during the initial phase of the distillation, or before the inhibitor reaches a given point, is effectively prevented.

The superior results obtained when using the polymerization inhibitors of the present invention are very striking, as shown by the following example.

*Example.*—In an installation involving the absorption of a cracked hydrocarbon mixture in a higher-boiling hydrocarbon absorption medium, followed by treatment of the enriched absorption medium in a de-ethanizer and then a de-propanizer, about 50 parts per million of isoamyl nitrite are continuously introduced into the feed to the de-ethanizer. The tails from the de-ethanizer are passed to the middle of the de-propanizer, carrying along isoamyl nitrite. A portion of the tails from the de-propanizer, still containing isoamyl nitrite, is passed back to the top of the absorber where it becomes enriched in the relatively lower boiling hydrocarbons. The effluent from the bottom of the absorber is then passed as feed to the middle of the de-ethanizer, where more isoamyl nitrite is added continuously, to make up for losses in the system and for the portion which leaves the system at the bottom of the de-propanizer. Hence, by introducing the isoamyl nitrite to the de-ethanizer, the inhibitor is carried over into the de-propanizer and thence into the absorber, thus providing highly effective protection for all three of these distillation units. Operation in the foregoing manner resulted in at least six months' postponement of a shutdown which would otherwise have been necessitated by the fouling of the calandria and the consequent decrease in the rate of heat transfer into the unit. This constitutes a very great percentage of increase in the time during which such a unit can be operated without having to be shut down for cleaning.

A series of experiments has been run in which various inhibitor candidates were tested to determine their ability to retard or prevent polymer growth. In these experiments, about 4 mm. of "popcorn" polymer seed was placed in a test tube in contact with the monomer composition containing the inhibitor to be tested and heated to 60° C. The effectiveness of the particular inhibitor was determined by the rate of growth of the polymer. In one such series of tests, the blank and a number of compositions containing inhibitors such as sodium nitrite, ammonia, m-phenylenediamine, diethylamine, hexamethylenediamine, aniline, and monoethanolamine, showed an amount of polymer growth of at least 1 inch in one day. In contrast to this, the sample containing isoamyl nitrite (50 p. p. m.) grew only ⅛ inch in the same time, and the sample containing both isoamyl nitrite and p-tertiary butyl catechol had grown only ⅛ inch after nine days. The particular effectiveness of the combination of isoamyl nitrite and p-tertiary butyl catechol is not fully understood but it may be that these two compounds react together to liberate NO slowly, and that this slowly available NO is responsible for the excellent results.

In another series of tests, various inhibitors such as hydroquinone, semicarbazide, benzidine, diphenylbenzidine, phenyl alphanaphthylamine, phenyl thiocarbazide, and pyrogallic acid, showed a rate of growth of at least 2 inches in a period of four days. In contrast to this, the corresponding samples containing ethyl nitrite, isopropyl nitrite and isoamyl nitrite showed either no growth at all or else a growth of no more than ¼ inch during this same period. The sample containing phenyl hydrazine also showed no growth during this period. In still another test, a sample containing isoamyl nitrite as the sole inhibitor did not show any growth of polymer after 28 days.

No satisfactory theory has been advanced to explain the nature and characteristics of the "popcorn" polymer. It is a non-fusible, non-soluble polymer which appears to be extensively cross-linked. It is not known whether the presence of air, peroxides, or free radicals has anything to do with the formation or propagation of this polymer. Ordinary free radical inhibitors of the type which remove peroxides, however, are ineffective in preventing its propagation. The nitrite inhibitors of the present invention are most effective when employed before any "popcorn" polymer has had a chance to form, but even if some of the polymer has formed, these inhibitors are also highly effective in inhibiting further propagation.

As will be readily apparent to those skilled in the art, various changes and modifications may be made in this process without departing from the spirit of the invention, and it is intended that all such changes and modifications shall be included within the scope of the following claims.

I claim:

1. A process for minimizing polymer formation when distilling a composition comprising a major portion of hydrocarbons containing no more than six carbon atoms, said composition containing paraffins and monoolefins in major amount and at least 0.01 per cent by weight of a diolefin having from 3 to 6 carbon atoms, which process comprises carrying out the distillation of said composition while maintaining present therein throughout the distillation a polymerization inhibitor comprising from 0.001 per cent to 5 per cent, based on the weight of said composition, of a nitrite of the formula $R.NO_2$ in which R is a hydrocarbon radical having from one to eight carbon atoms and having an alkyl carbon atom to which the nitrite group is attached.

2. A process according to claim 1 in which the composition being distilled consists primarily of paraffins and olefins containing no more than four carbon atoms dissolved in a higher-boiling hydrocarbon mixture.

3. A process according to claim 1 in which the hydrocarbon mixture being distilled contains constituents derived from the cracking of propane.

4. A process according to claim 1 in which the diolefin is butadiene.

5. A process according to claim 1 in which the diolefin is cyclopentadiene.

6. A process according to claim 1 in which the concentration of the nitrite polymerization inhibitor is from about 0.001 per cent to about 0.10 per cent by weight.

7. A process according to claim 1 in which the nitrite is ethyl nitrite.

8. A process according to claim 1 in which the nitrite is isopropyl nitrite.

9. A process according to claim 1 in which the nitrite is isoamyl nitrite.

10. A process according to claim 1 in which the polymerization inhibitor also comprises p-tertiary butyl catechol.

11. A process according to claim 1 in which the polymerization inhibitor comprises isoamyl nitrite and p-tertiary butyl catechol.

12. A process according to claim 1 which is operated continuously and in which the nitrite inhibitor is added along with the feed.

13. A process according to claim 1 which is operated continuously and in which the nitrite inhibitor is added together with the reflux.

14. A process according to claim 1 which is operated continuously and in which the nitrite inhibitor is added to the bottom of the distillation unit.

15. A process for minimizing polymer formation when distilling a composition consisting primarily of paraffins and olefins containing no more than four carbon atoms dissolved in a higher-boiling hydrocarbon mixture, said composition containing at least 1 per cent of a diolefin having from 3 to 6 carbon atoms, which process comprises carrying out the distillation of said composition while maintaining present therein throughout said distillation from 0.001 per cent to 0.10 per cent of isoamyl nitrite, based on the weight of said composition.

16. A process which comprises providing a low-boiling hydrocarbon mixture consisting primarily of paraffinic, olefinic and diolefinic hydrocarbons having no more than four carbon atoms; contacting said low-boiling hydrocarbon mixture in an absorber with a higher-boiling hydrocarbon mixture; passing the enriched absorption medium from the absorber to a de-ethanizer in which ethane, ethylene and hydrocarbons boiling lower than ethane are removed overhead; passing the resulting partially stripped absorption medium to a de-propanizer in which propane and propylene are removed overhead; returning at least a portion of the absorption medium that is removed from the depropanizer to the absorber; and introducing into the deethanizer a polymerization inhibitor comprising from 0.001 per cent to 0.10 per cent of isoamyl nitrite, based upon the weight of hydrocarbons being introduced into said de-ethanizer, the isoamyl nitrite being carried in the tails from the de-ethanizer to the de-propanizer and thence to the absorber, whereby polymer formation in the de-ethanizer and the de-propanizer is minimized.

17. A process according to claim 16 in which the gases taken overhead from the de-ethanizer are subjected to further fractionation and highly purified ethylene is recovered therefrom.

References Cited in the file of this patent

UNITED STATES PATENTS

| | | |
|---|---|---|
| 1,550,323 | Ostromislensky | Aug. 18, 1925 |
| 2,267,309 | Senkus | Dec. 23, 1941 |
| 2,241,717 | Robinson et al. | May 13, 1941 |
| 2,388,429 | McKinnis | Nov. 6, 1945 |
| 2,613,175 | Johnstone et al. | Oct. 7, 1952 |

OTHER REFERENCES

Kharasch et al.: "Inhibition of Polymerization," Industrial and Engineering Chemistry," vol. 39, pp. 830–837 (July 1947).